(12) United States Patent
Bueker et al.

(10) Patent No.: US 11,104,368 B2
(45) Date of Patent: Aug. 31, 2021

(54) STEERING COLUMN ASSEMBLY

(71) Applicants: TRW Automotive GmbH, Alfdorf (DE); TRW Limited, Solihull (GB)

(72) Inventors: Richard Bueker, Willich (DE); Tomasz Karp, Meerbusch (DE); Patrick Ericke, Dormagen (DE); Milos Krivan, Trebelovice (CZ); Niclas Davies, Birmingham (GB)

(73) Assignee: TRW Automotive GmbH, Alfdorf (DE)

( * ) Notice: Subject to any disclaimer, the term of this patent is extended or adjusted under 35 U.S.C. 154(b) by 69 days.

(21) Appl. No.: 16/216,156

(22) Filed: Dec. 11, 2018

(65) Prior Publication Data

US 2019/0185043 A1 Jun. 20, 2019

(30) Foreign Application Priority Data

Dec. 18, 2017 (DE) .......................... 102017130358.8

(51) Int. Cl.
*B62D 1/184* (2006.01)
*B62D 1/19* (2006.01)
*B62D 1/185* (2006.01)

(52) U.S. Cl.
CPC ............. *B62D 1/184* (2013.01); *B62D 1/185* (2013.01); *B62D 1/19* (2013.01); *B62D 1/195* (2013.01)

(58) Field of Classification Search
CPC .......... B62D 1/184; B62D 1/195; B62D 1/19; B62D 1/185
See application file for complete search history.

(56) References Cited

U.S. PATENT DOCUMENTS 8,882,147 B2 11/2014 Schnitzer et al.
9,428,215 B1 8/2016 Nagatani et al.
(Continued)

FOREIGN PATENT DOCUMENTS

DE 102009055973 B3 6/2011
DE 102014016510 B4 2/2016
(Continued)

OTHER PUBLICATIONS

European Search Report, Application No. 18208958.1 dated May 24, 2019.

*Primary Examiner* — Paul N Dickson
*Assistant Examiner* — Joselynn Y Sliteris
(74) *Attorney, Agent, or Firm* — Robert James Harwood

(57) ABSTRACT

A steering column assembly for a motor vehicle, having a vehicle-fixed mounting dement and a sleeve element which is received within the mounting element and is mounted for displacement in the axial direction in the mounting element for adjustment of the steering column assembly, includes an energy absorption device having two absorption elements, a locking element for locking a steering wheel, and a coupling device. The locking element has an open position, in which the steering wheel is adjustable and a coupling element is movable in the axial direction, and a closed position, in which an absorption dement is firmly coupled to the mounting element. The coupling device has a coupled position and an uncoupled position, both absorption elements being firmly connected to each other in the coupled position. During normal operation of the motor vehicle, the locking element is in the closed position and the coupling device is in the coupled position.

10 Claims, 6 Drawing Sheets

(56) References Cited

U.S. PATENT DOCUMENTS

| | | | |
|---|---|---|---|
| 10,315,682 B2 | 6/2019 | Agbor et al. | |
| 10,759,465 B2 * | 9/2020 | Ganahl | B62D 1/184 |
| 2012/0285286 A1 | 11/2012 | Schnitzer et al. | |
| 2017/0247046 A1 | 8/2017 | Huber et al. | |
| 2018/0297626 A1 | 10/2018 | Huber et al. | |
| 2019/0367073 A1 * | 12/2019 | Buker | B62D 1/195 |
| 2020/0172149 A1 * | 6/2020 | Appleyard | B62D 1/192 |

FOREIGN PATENT DOCUMENTS

| | | |
|---|---|---|
| DE | 102015204476 B3 | 5/2016 |
| DE | 102015225907 A1 | 6/2017 |
| WO | 2018064161 A1 | 4/2018 |
| WO | 2018153773 A1 | 8/2018 |

* cited by examiner a)

b)

a)

b)

a)

b)

c)

STEERING COLUMN ASSEMBLY

CROSS-REFERENCE TO RELATED APPLICATIONS

This application claims priority to German Patent Application No. 10 2017 130 358.8, filed 18 Dec. 2017, the disclosures of which are incorporated herein by reference in entirety.

BACKGROUND TO THE INVENTION

The invention relates to a steering column assembly for a motor vehicle, including an energy absorption device.

Various steering column assemblies for motor vehicles that have an energy absorption device are known from the prior art. In the event of a vehicle crash, the energy absorption device dampens the impact of the driver on the steering wheel. In the process, the steering column is shifted in the axial direction away from the driver into the instrument panel, and energy-absorbing components such as, e.g., rolling straps or rolling tear straps absorb part of the energy through plastic deformation.

Steering column assemblies having an energy absorption device are intended in particular for vehicles equipped with an airbag in the steering wheel, which in some countries may be driven without wearing a seat belt. In order to minimize a risk of injury, the energy absorption device needs to absorb a significant part of the forces acting on the driver when the driver hits the steering wheel or the airbag. The amount of energy to be absorbed by the energy absorption device depends on a number of factors, in particular on whether the driver has buckled up.

SUMMARY OF THE INVENTION

A feature of the invention resides in providing a steering column assembly with an energy absorption device that shows an appropriate energy absorption behavior depending on the situation.

The present invention provides a steering column assembly for a motor vehicle, including a vehicle-fixed mounting element and a sleeve element which is received within the mounting element and is mounted for displacement in the axial direction in the mounting element for adjustment of the steering column assembly. The steering column assembly has an energy absorption device which is adapted to be firmly coupled to the mounting element and is firmly connected with the sleeve element, the energy absorption device being deformed in consequence of the longitudinal displacement of the sleeve element in the event of a vehicle crash and absorbing part of the kinetic energy of the sleeve element in the process. The steering column assembly further includes a locking element having an open position and a closed position, the locking element, when in the open position, permitting an adjustment of the sleeve element and, when in the closed position, fixing it in position. Furthermore, a coupling device is provided including a coupling element and having a coupled position and an uncoupled position. The energy absorption device includes at least a first absorption element and a second absorption element, each of which is configured to deform plastically by a relative movement of the sleeve element in relation to the mounting element in the case of a vehicle crash. In the coupled position of the coupling device, the first absorption element is firmly coupled to the second absorption element by means of the coupling element. The term "firmly coupled by means of the coupling element" here is understood to mean that a force is transmitted between the two absorption elements by means of the coupling element. The two absorption elements are not necessarily coupled directly to each other and only by means of the coupling element. Further components may be involved in coupling the two absorption elements. For example, the second absorption element may be directly coupled to a further component by means of the coupling element, while the further component, in turn, is directly coupled to the first absorption element. In the closed position of the locking element, at least the first absorption element is firmly coupled to the mounting element, and in the open position, the coupling element is movable in the axial direction jointly with the sleeve element. During a normal operation of the motor vehicle, the locking element is in the closed position and the coupling device is in the coupled position. The two absorption elements may each be absorption straps. In particular, they consist of an energy-absorbing material, for example of metal. They may, however, also have a different, suitable geometry and/or be made from a different, suitable material or composite material. "Suitable" in this context means that the geometry and choice of materials allow the absorption elements to absorb energy during plastic deformation.

The steering column assembly according to the invention thus has an initial position (with the coupling device in the coupled position and the locking element in the closed position), in which both absorption elements are coupled to the sleeve element and, in the event of a vehicle crash, a first amount of energy is absorbed jointly by the two absorption elements. In addition, the steering column assembly has a further position (with the coupling device in the uncoupled position and the locking element in the closed position), in which only the first absorption element is coupled to the sleeve element and, in the event of a vehicle crash, a second amount of energy is absorbed by the first absorption element, the second amount of energy being smaller than the first amount of energy. When the locking element is in the open position, the sleeve element can be adjusted relative to the mounting element even though the second absorption element is coupled to the sleeve element. This is ensured by the fact that the coupling element is movable in the axial direction of the sleeve element as long as the locking element is in the open position.

The coupling device is configured in such a way that, based on an energy absorption requirement in the event of a vehicle crash, it remains in the coupled position or switches over to the uncoupled position. The term energy absorption requirement here refers to a requirement that is determined by external parameters, such as whether or not the driver has fastened his or her seat belt. Further parameters may include the mass of the driver, the current vehicle speed and/or the deceleration in a vehicle crash. In other words, the energy absorption requirement specifies the amount of energy that needs to be absorbed in the event of a vehicle crash in order to cushion the driver in the best possible way. So if the energy absorption requirement is high, the coupling device remains in its coupled position. If, on the other hand, the energy absorption requirement is relatively low, the coupling device switches over to the uncoupled position. For example, the parameters relevant to the energy absorption requirement can be checked at defined intervals, for example at a frequency of 100 Hz, and the energy absorption requirement can be adjusted accordingly before or while the vehicle is in motion. In this way, the coupling states of the absorption elements can be adapted to the current parameters at all times.

Preferably, the coupling element is a steering rack. By means of a toothing of the steering rack, each of the absorption elements is simply coupled to the steering rack by a matching counter toothing.

In particular, at least one of the first and second absorption elements includes a toothing substantially complementary to the toothing of the steering rack.

According to one configuration of the invention, the energy absorption device comprises at least one sliding block which is firmly connected to the first absorption element, the sliding block being firmly coupled to the mounting element in the closed position of the locking dement and being uncoupled from the mounting element in the open position of the locking element. For axial adjustment of the sleeve element, the locking element is moved to the open position and the sliding block is then movable with the sleeve element in the axial direction. The energy absorption device may also comprise a plurality of sliding blocks, in particular with a separate locking element being provided for each sliding block.

According to a further configuration of the invention, the sliding block and the second absorption element each include a toothing substantially complementary to the toothing of the steering rack. This means that the second absorption element can then be firmly coupled to the sliding block by means of the steering rack and thus also to the first absorption element.

One aspect provides that in the closed position of the locking element, the sliding block is connected to the locking element with at least one of an interlocking and a frictional fit. This ensures a particularly good coupling between the sliding block and the locking element, for example in that the sliding block has a toothing and the locking element has a corresponding toothing. In this way, secure latching in the axial direction is ensured. In addition, the toothing can be made use of to adjust the sleeve element in the axial direction by means of an electric drive.

Preferably, the coupling device comprises an adjusting element which has a first and a second position, the adjusting element when in the first position holding the coupling element in the coupled position and when in the second position holding the coupling element in the uncoupled position. In other words, the coupling device is adapted to be switched over from the coupled position to the uncoupled position by the adjusting element being moved from the first to the second position.

It is further preferred that the adjusting element is a guide part, in particular a wedge plate, which has an upper side which is configured as a longitudinal guide and is in contact with the coupling element, the guide part having wedge-shaped projections on a lower side facing away from the upper side. In particular, the coupling element is movable in the axial direction along the upper side of the guide part, which allows an adjustment of the sleeve element even in the coupled position of the coupling device.

One aspect provides that the adjusting element and the coupling element are connected by means of a connecting part in such a way that the coupling element is movable relative to the adjusting element in the axial direction of the sleeve element, in particular wherein the coupling element and the adjusting element are immovable relative to each other in directions perpendicular to the axial direction. As a result, the coupling element is stably guided along the guide part and the coupling element is movable relative to the adjusting element in the axial direction only. This ensures a stable connection between the two absorption elements even during adjustment of the sleeve element.

The connecting part may be a profiled part having an essentially C-shaped cross-section when viewed in the axial direction.

According to a further aspect, the mounting element has recesses provided therein, in particular elongated holes, which are shaped in such a way that they can receive the wedge-shaped projections of the guide part, whereby a guide is produced. This more particularly results in two different positions of the guide part. In a first position, the wedge-shaped projections are received in the recesses, and in the second position, the wedge-shaped projections rest on the mounting element outside the recesses. In particular, the first and second positions of the guide part are such that in the axial direction of the sleeve element, the guide part when in the first position is lowered as compared to the second position, namely along the elongated holes.

The recesses may be arranged obliquely as viewed in the axial direction of the sleeve element, preferably each arranged obliquely towards a steering wheel. When the wedge-shaped projections are in the recesses and a sufficient amount of force acts on the guide part towards the steering wheel, the wedge-shaped projections slide along an edge of the recesses and the guide part is raised. When, the other way round, the wedge-shaped projections are outside the recesses and the guide part is acted upon by a force in a direction away from the steering wheel, the wedge-shaped projections slide along the edge of the recesses and into the recesses and the guide part is lowered.

In particular, in the uncoupled position of the coupling device, the wedge-shaped projections of the guide part are received in the recesses. Lowering of the guide part will also cause a lowering of the coupling element, causing it to become disengaged from the energy absorption device, so that the second absorption element is uncoupled from the first absorption element. This allows the coupling device to be switched from the coupled position to the uncoupled position in a simple manner.

Preferably, the coupling device has at least one of a pyrotechnic and an electric actuator which is configured to switch the coupling device from the coupled position to the uncoupled position when or before a crash occurs. In particular, the actuator switches the coupling device to the uncoupled position when the energy absorption requirement is relatively low, as explained further above. A pyrotechnic actuator here has the advantage that switchover times are very short. An electric actuator, on the other hand, has the advantage that it can be used several times, that is, it can switch over the coupling device between the coupled and uncoupled positions several times.

The actuator further preferably includes a displaceable, e.g. retractable, holding part, the mounting element having a recess adapted to receive the holding part, in particular wherein the holding part, when in an extended position, holds the adjusting element in the first position, and the actuator is configured to retract the holding part when or before a crash occurs. In this context, a face side of the adjusting element may rest against the holding part. In this way, the coupling device can be switched over particularly quickly between the coupled and uncoupled positions.

In particular, the holding part is movable within the recess, e.g. also in the axial direction. The holding part thereby determines the axial position of the adjusting element. The actuator is fixed in place at the mounting element by a screw, for example, whereby the axial position of the adjusting element is fixed as long as the holding part is in its extended state.

In a preferred embodiment, a spring element is provided which urges the coupling device towards the uncoupled position. As a result, no external force is necessary to switch the coupling device from the coupled position to the uncoupled position.

Other advantages of this invention will become apparent to those skilled in the art from the following detailed description of the preferred embodiments, when read in light of the accompanying drawings.

DETAILED DESCRIPTION OF THE INVENTION

Figure 1:
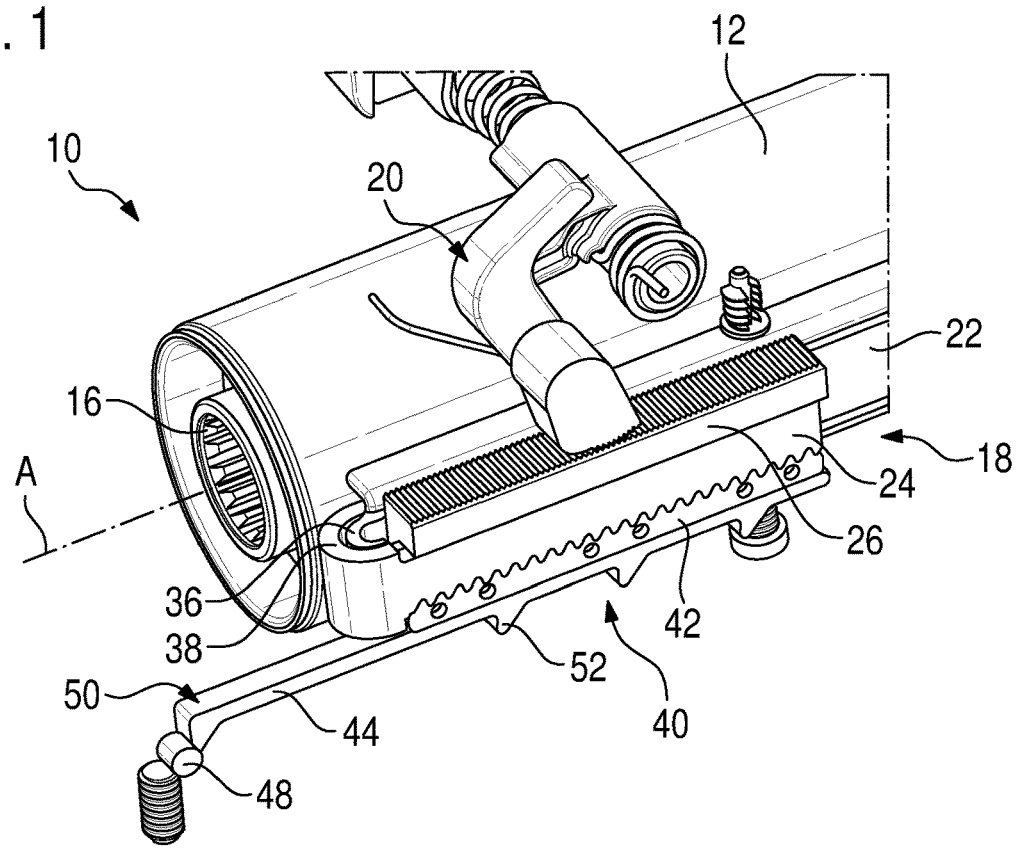
FIG. 1 shows a perspective view of a steering column assembly according to the invention.
Figure 2:
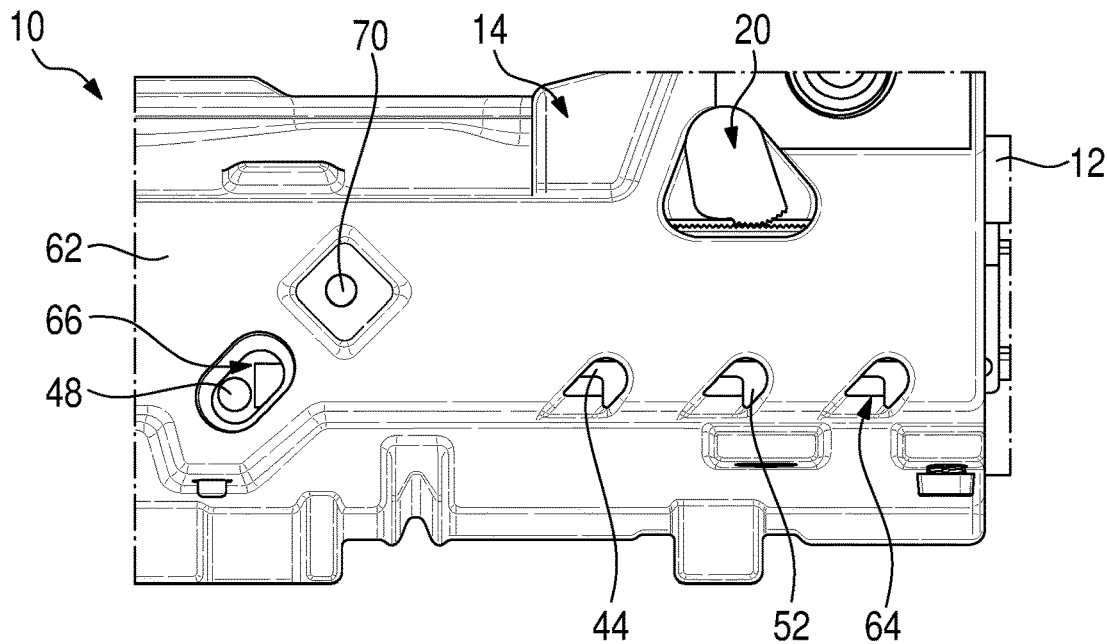
FIG. 2 shows a side view of a detail of the steering column assembly according to the invention of FIG. 1.

FIGS. 1 and 2 show a perspective side view of a steering column assembly 10 of a vehicle as is typically used in motor vehicles, in particular passenger cars.

The steering column assembly 10 comprises a sleeve element 12 and a vehicle-fixed mounting element 14 (shown in FIG. 2). The sleeve element 12 is mounted in the mounting element 14 so as to be displaceable in the axial direction (essentially along an axis A) of the sleeve element 12. A steering wheel of the motor vehicle is attached to the sleeve element 12 so that an axial position of the steering wheel can be adjusted by displacing the sleeve element 12.

The sleeve element 12 forms a receptacle for a steering spindle 16, which is mounted in the sleeve element 12 so as to be rotatable about the axis A and is axially adjustable together with it for steering wheel adjustment.

An energy absorption device 18 is provided on the outside of the sleeve element 12 and is firmly connected to the sleeve element 12.

The mounting element 14 is connected, preferably so as to be height-adjustable, to the chassis of the motor vehicle by means of a carrier (not illustrated) and is firmly installed. In the vehicle.

The mounting element 14 further comprises a locking element 20 which is configured such that it can fix (i.e. lock) the sleeve element 12 in place in the axial direction. More precisely, the locking element 20 has an open position and a closed position. In the open position, the sleeve element 12 is released for displacement in the axial direction. In the closed position, however, the sleeve element 12 is fixed in place in the axial direction.

The locking element 20 is adapted to be moved between the open and closed positions, for example by means of a lever (not shown), with the standard position, that is, the position during normal operation of the motor vehicle, being the closed position.

The energy absorption device 18 comprises a first absorption element 22 and a second absorption element 24 as well as a sliding block 26.

In the embodiments shown in FIGS. 1 to 8, the two absorption elements 22, 24 are each in the form of an absorption strap. Preferably, the two absorption elements 22, 24 are each made of metal. They may, however, also have a different suitable geometry and/or be made of a different suitable material or composite material. The term "suitable" here means that the geometry and choice of materials allow the absorption elements 22, 24 to absorb energy during a plastic deformation, as will be discussed below using the example of the absorption straps.

In the variant shown, the first absorption element 22 is a rolling tear strap and the second absorption element 24 is a rolling strap. However, each of the two absorption elements 22, 24 may be a rolling strap or a rolling tear strap.

In the exemplary embodiment shown, the first and second absorption elements 22, 24 each have essentially the shape of a metal strip bent to a U and a J, respectively. The two absorption elements 22, 24 thus each include a first leg 28, 30 and a second leg 32, 34 (see e.g. FIGS. 3(a) and 4(a)), the first leg 28, 30 and the second leg 32, 34 each being connected to each other by an arcuate section 36, 38 (see FIG. 1).

Both absorption elements 22, 24 are firmly connected to the sleeve element 12 by their respective first leg 28, 30. The first absorption element 22 is firmly connected to the sliding block 26 by its second leg 32.

In the closed position of the locking element 20, the sliding block 26 is connected to the vehicle-fixed mounting element 14 by means of the locking element 20 with an interlocking and/or a frictional fit, so that the second leg 32 of the first absorption element 22 is also firmly connected to the mounting element 14.

The locking element 20 and the sliding block 26 may have toothings that are substantially complementary to each other, so that the locking element 20 and the sliding block can lock together at various axial positions of the sliding block 26. Alternatively or additionally, the locking element 20 and the sliding block 26 may be configured in such a way that they can be connected to each other with a frictional fit at various axial positions.

The second leg 32 of the second absorption element 24 can be firmly coupled to the first absorption element 22, more precisely to the second leg 32 of the first absorption element 22, by means of a mechanical coupling device 40.

The coupling device 40 includes a coupling element 42 in the form of a steering rack and an adjusting element 44 in the form of a guide part (a bar-like part here), which in the embodiment shown here is a wedge plate.

In addition, an actuator 46 is provided (see FIGS. 3 to 5), of which only a retractable holding part 48 can be seen in FIGS. 1 and 2.

The adjusting element 44 has a substantially flat upper side 50 (see e.g. FIGS. 1 and 9), which is in contact with the coupling element 42. The adjusting element has a plurality of wedge-shaped projections 52 on a lower side facing away from the upper side 50.

As is especially well visible in FIGS. 3(a) and 4(a), the coupling element 42 and the adjusting element 44 may be connected to each other by means of a connecting part 54. The elongated connecting part 54, which is constructed as a profiled rail, has a substantially C-shaped cross-section. Legs of the connecting part 54 here engage in a respective lateral recess of the coupling element 42 and of the adjusting element 44. As a result, the coupling element 42 is movable relative to the adjusting element 44 in the axial direction of the sleeve element 12. However, the coupling element 42 and the adjusting element 44 are firmly connected to each other in a direction perpendicular to the upper side 50 of the adjusting element 44.

In the variant shown here, the lower sides of the first and second absorption elements 22, 24 each have a toothing 56, 58, which is substantially complementary to a toothing 60 of the coupling element 42. When the toothings 56, 58 of the first and second absorption elements 22, 24 are each in engagement with the toothing 60 of the coupling element 42 (coupled position of the coupling device 40), the first and second absorption elements 22, 24 are firmly coupled to each other. Since the first absorption element 22 is firmly attached to the sliding block 26, the second absorption element 24 is then also firmly coupled to the sliding block 26. This means that in the closed position of the locking element 20, the second absorption element 24, more precisely its second leg 34, is also firmly connected to the mounting element 14. The second leg 34 is then vehicle-fixed.

FIG. 2 shows a section of the steering column assembly 10 in a side view, with a housing 62, not shown in FIG. 1, of the mounting element 14 being illustrated here.

The housing 62 has recesses 64 provided therein, which are designed as elongated holes. The recesses 64 are inclined preferably towards the steering wheel (not illustrated) in the axial direction. The recesses 64 are configured such that they can receive the wedge-shaped projections 52 to form oblique guides.

Figure 8:
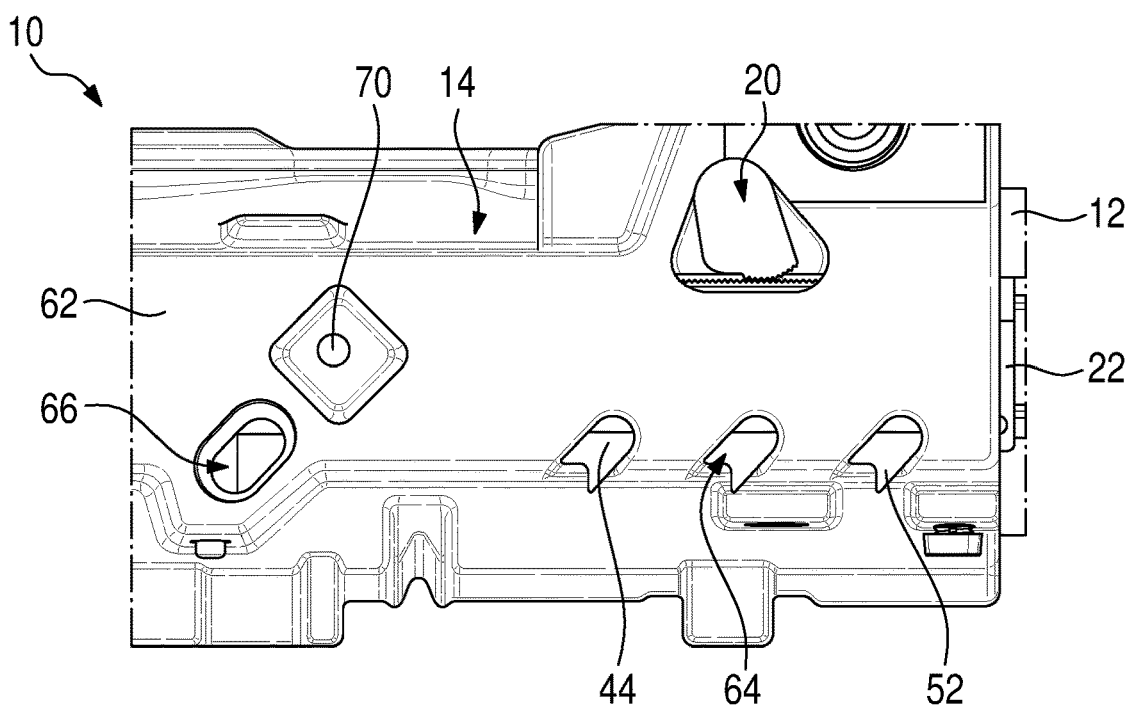
FIG. 8 shows a side view of the detail of FIG. 2 of the steering column assembly according to the invention of FIG. 1 in the uncoupled position.

This more particularly results in two different positions of the adjusting element 44. In a first position, which is shown in FIGS. 2, 3(b), 6 and 7, the wedge-shaped projections 52 rest on the housing 62 of the mounting element 14 outside the recesses 64. In a second position, which is shown in FIGS. 4(b) and 8, the wedge-shaped protrusions 52 are received in the recesses 64. In particular, the first and second positions of the adjusting element 44 are such that in the second position, the adjusting element 44, viewed in the axial direction of the sleeve element 12, is vertically lowered as compared to the first position.

In addition, the housing 62 has a further recess 66, which can accommodate the holding part 48 of the actuator 46.

In the following, the operating principle of the steering column assembly 10 will be discussed in more detail.

FIGS. 1 to 3, 6 and 7 show the steering column assembly during normal operation of the motor vehicle.

The locking element 20 is in the closed position and the coupling device 40 is in the coupled position. Here, a face side of the adjusting element 44 rests against the holding part 48, which is accommodated in the recess 66 which is arranged obliquely in the axial direction preferably toward the steering wheel. The holding part 48 thus holds the adjusting element 44 in the first position described above, in which the coupling element 42 is in engagement with the two absorption elements 22, 24.

In particular, the axial position of the adjusting element 44 is therefore defined by the holding part 48. In order to set the exact axial position of the adjusting element 44, the holding part 48 may be moved within the recess 66 as far as the desired position when the actuator 46 is mounted. The actuator is then attached to the housing 62, for example by means of a screw 68 in a matching hole 70 (see FIGS. 6 and 7). This fixes the axial position of the holding part 48 and thus of the adjusting element 44.

Now if a vehicle crash occurs in which a high energy absorption requirement is determined, for example because the driver has not fastened his or her seat belt, the coupling device 40 remains in the coupled position.

A force acting on the steering wheel in the axial direction of the sleeve element 12 causes the sleeve element 12 to be displaced in the axial direction, and the first legs 28, 30 of the two absorption elements 22, 24 are displaced with it.

Since the locking element 20 is in the closed position, the second legs 32, 34 of the two absorption elements 22, 24 are firmly connected to the mounting element 14, i.e. essentially so as to be vehicle-fixed, by means of the sliding block 26. The case in which such a large force is applied in the vehicle crash that the mounting element 14 is also displaced is not taken into consideration here.

The relative movement of the first legs 28, 30 in relation to the second legs 32, 34 causes the two absorption elements 22, 24 to be plastically deformed, thereby absorbing energy.

If one of the two absorption elements 22, 24 is formed as a rolling tear strap, it is additionally torn off from the sleeve element 12 at its first leg 28 or, respectively, 30, whereby additional energy is absorbed. It is also possible for both absorption elements 22, 24 to be formed as rolling tear straps.

If, on the other hand, a vehicle crash occurs in which a low energy absorption requirement is determined, the coupling device 40 is switched from the coupled position to an uncoupled position as described below.

The actuator 46, which may be in the form of a pyrotechnic actuator or an electric actuator, retracts the holding part 48. As a result, the face side of the adjusting element 44 no longer rests against the holding part 48 and can move in the axial direction of the sleeve element 12.

Owing to the force acting on the sleeve element 12 in the axial direction during the vehicle crash, the second absorption element 24 is also acted upon by a force in the axial direction. This force is transmitted to the toothing 60 of the coupling element 42 via the toothing 58 of the second absorption element 24. In the embodiment shown, the force is transmitted from the coupling element 42 to the sliding block 26 via the toothing of the first absorption element 22. The force acting on the coupling element 42 not only has a component in the axial direction, but also an additional component perpendicular thereto (i.e. essentially in a direction that is perpendicular to the contact surface between the coupling element 42 and the adjusting element 44). This additional component of the force tends to separate the coupling element 42 from the absorption elements 22, 24, the size of this component depending mainly on a geometry of the toothings 56, 58, 60 and on the coefficients of friction of the connections between the first absorption element 22 and the coupling element 42 and between the second absorption element 24 and the coupling element 42.

Figure 4:
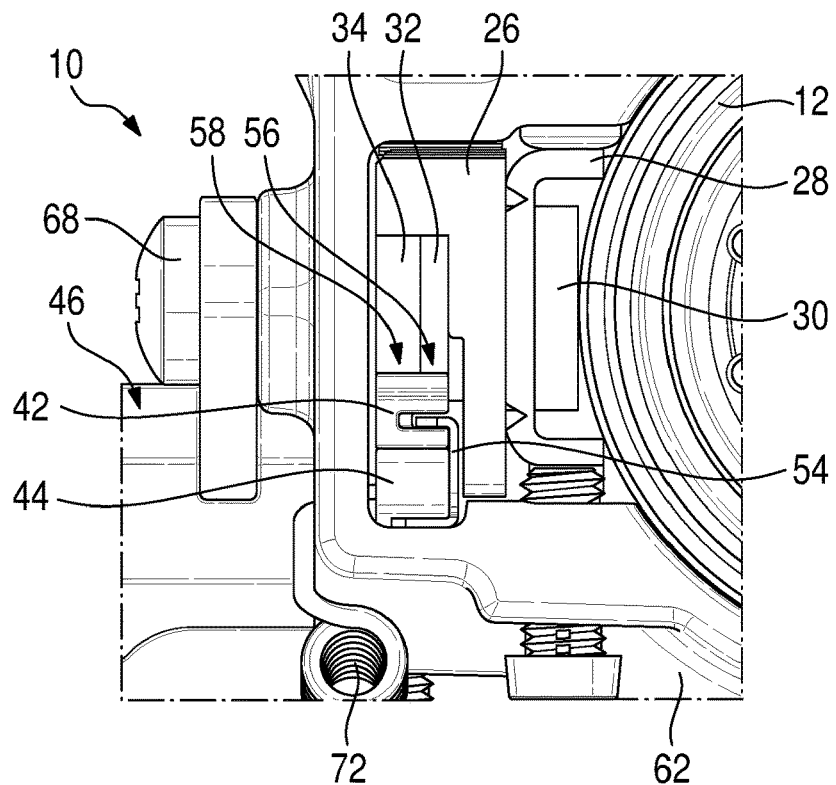
FIGS. 4(a) and (b) show a front view and a perspective view, respectively, of the detail of FIG. 3 in an uncoupled position.
Figure 4:
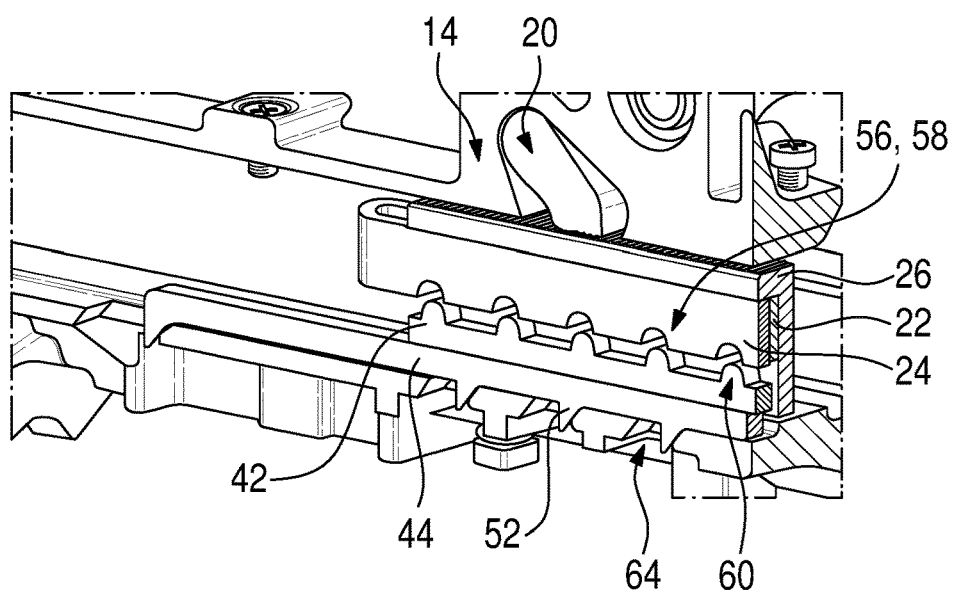
Figure 5:
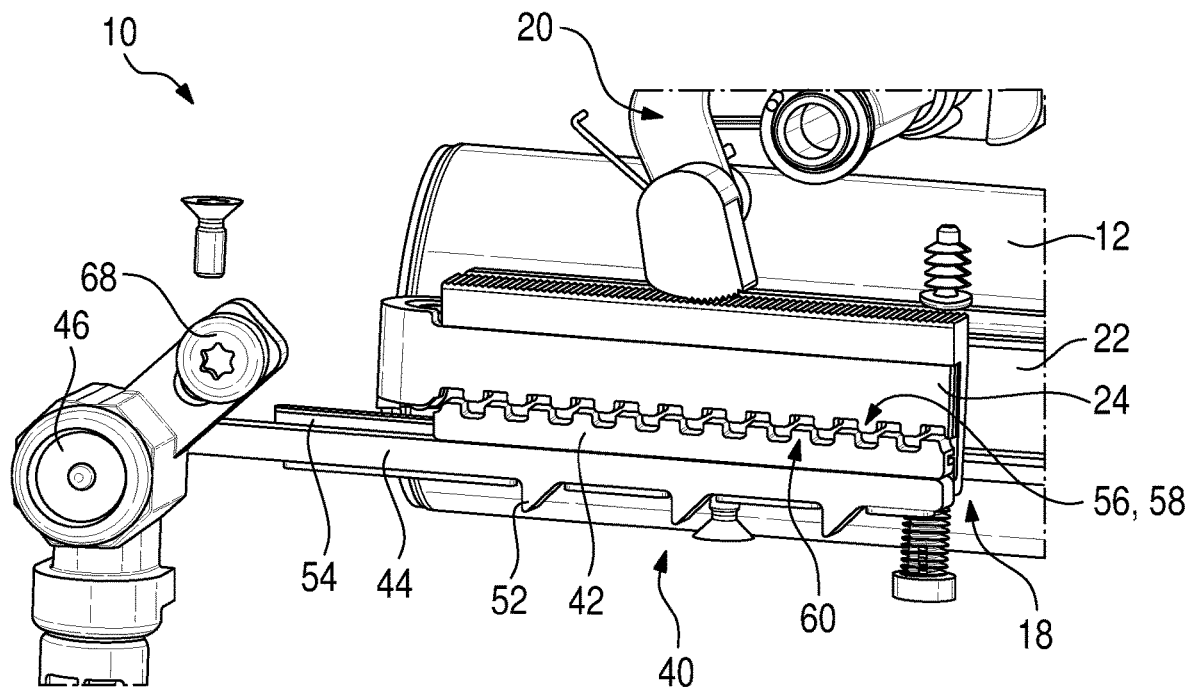
FIG. 5 shows a further perspective view of the steering column assembly according to the invention of FIG. 1 in an uncoupled position.
Figure 6:
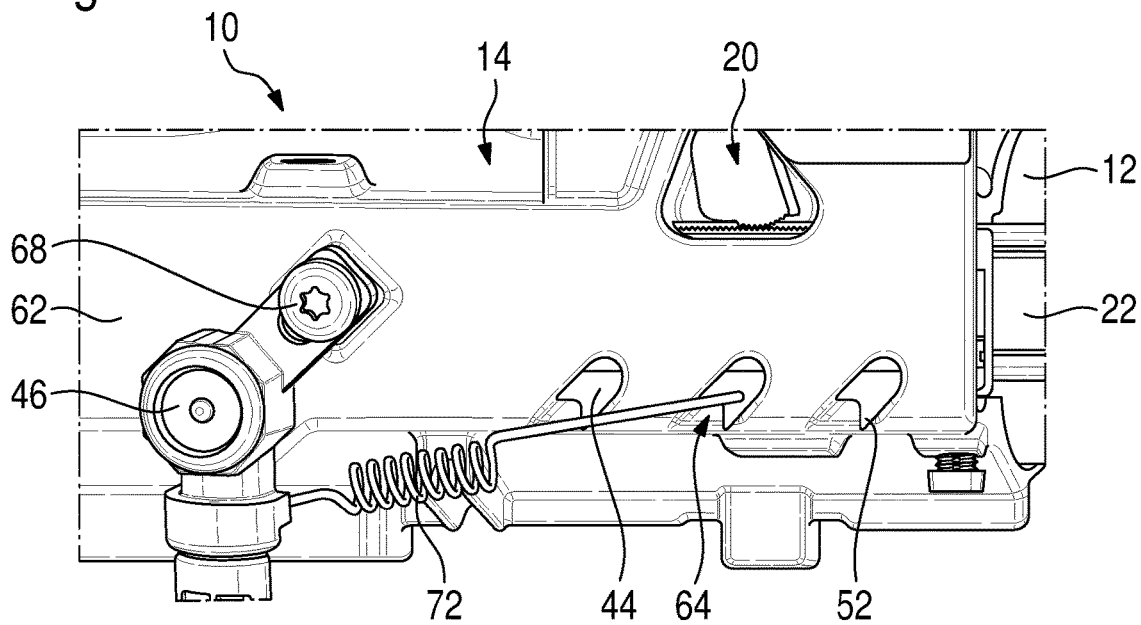
FIG. 6 shows a side view of the steering column assembly according to the invention of FIG. 1.
Figure 7:
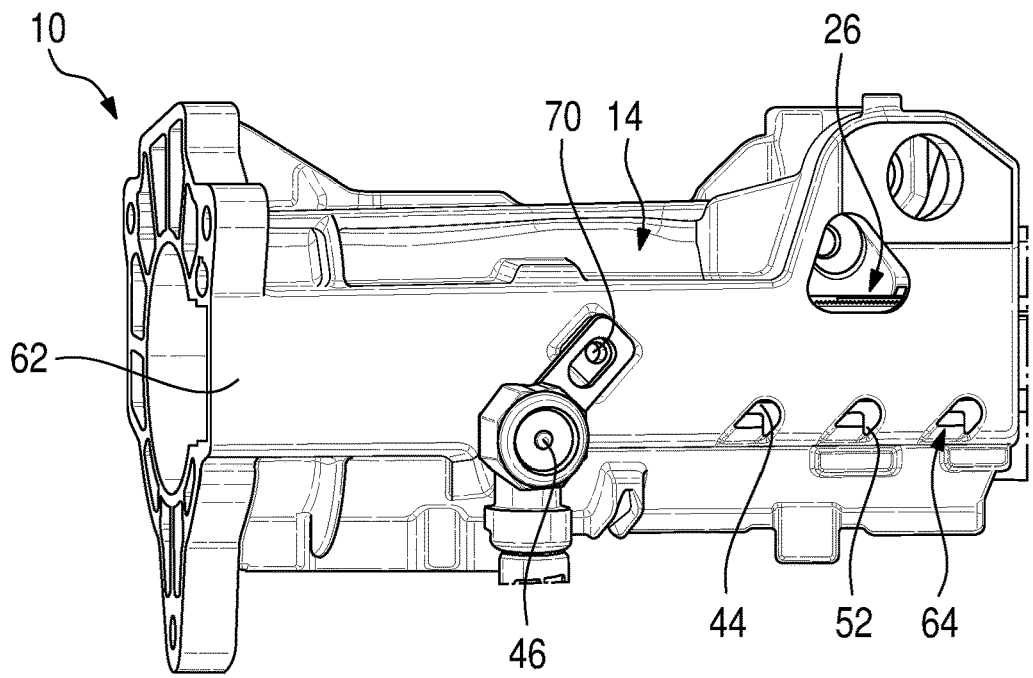
FIG. 7 shows a side view of a mounting element of the steering column assembly according to the invention of FIG. 1.

These forces cause the wedge-shaped projections 52 to slide along an edge of the recesses 64 and into the recesses 64, and the adjusting element 44 is lowered. Since the coupling element 42 is firmly connected with the adjusting element 44 except in the axial direction, this also causes the coupling element 42 to be lowered. The lowered position of the coupling element is shown in FIGS. 4, 5 and 8.

This causes the toothings 56, 58 of the absorption elements to become disengaged from the toothing 60 of the coupling element 42 (uncoupled position of the coupling device 40, see FIGS. 4, 5 and 8), so that the second absorption element 24 is no longer coupled to the first absorption element 22, in particular also no longer to the sliding block 26. The second leg 34 of the second absorption element is therefore no longer vehicle-fixed and, in the event of a displacement of the sleeve element 12, it will move with it.

The second leg 32 of the first absorption element 22, on the other hand, continues to be vehicle-fixed and absorbs energy during the vehicle crash by plastic deformation and/or tearing off of the first leg 28, as described above. The amount of energy absorbed in this case is smaller than in the case described earlier, in which both absorption elements 22, 24 absorb energy.

Figure 3:
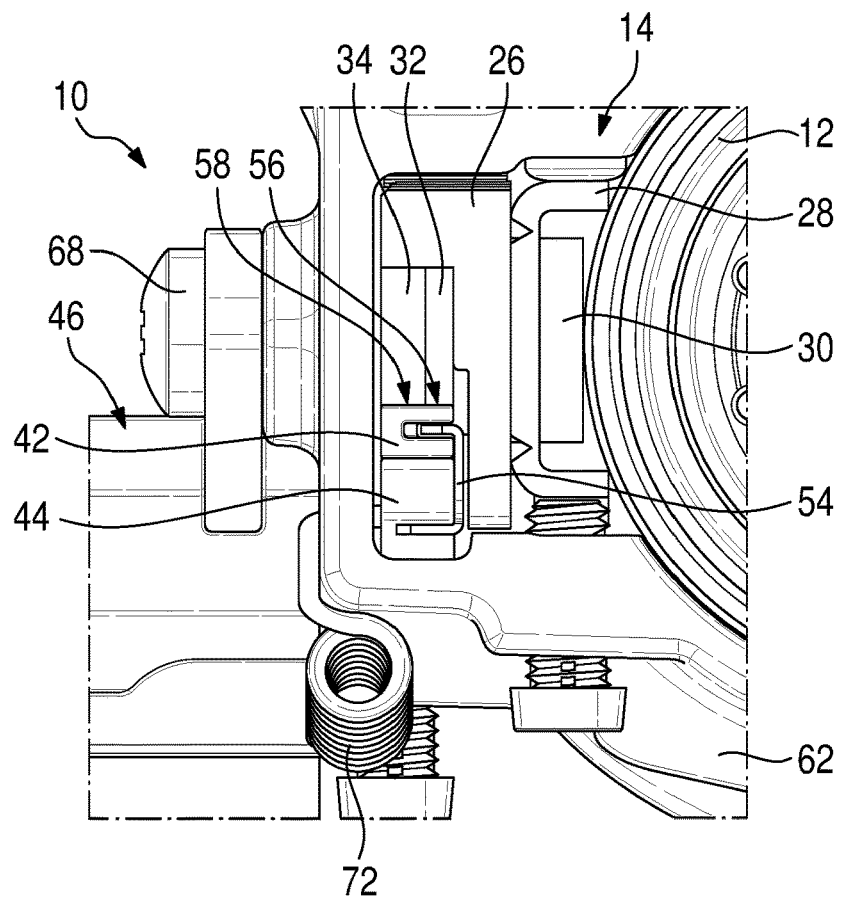
FIGS. 3(a) and (b) show a front view and a perspective view, respectively, of a detail of the steering column assembly according to the invention of FIG. 1 in a coupled position.
Figure 3:
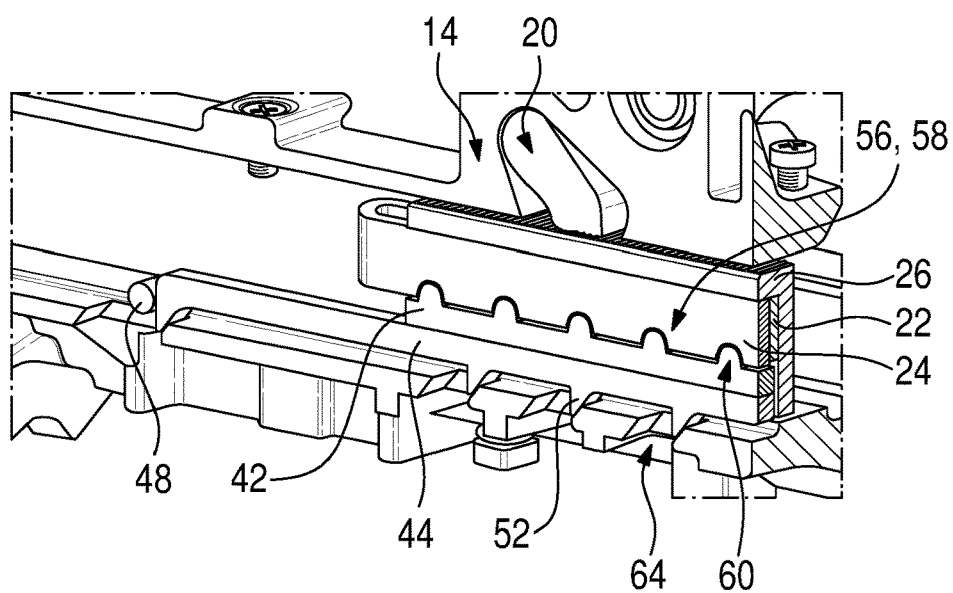

In order to reliably move the adjusting element 44 to the second (lowered) position irrespectively of the geometry of the toothings 56, 58, 60 and the coefficients of friction, a spring element 72 may be provided which urges the adjusting element 44 toward the second position (see FIGS. 3(*a*), 4(*a*) and 5). In this case, the coupling element 42 and the adjusting element 44 are connected with each other by means of the connecting part 54 as described above, as a result of which the spring element 72 urges the coupling element 42 toward the uncoupled position.

As already mentioned, in a normal operation of the motor vehicle, the locking element 20 is in the closed position and the coupling device 40 is in the coupled position.

In order to be able to adjust the steering wheel in the axial direction, the locking element 20 is moved from the closed position to the open position, for example by means of a lever, so that the sliding block 26 is released and is no longer vehicle-fixed.

The coupling device 40 remains in the coupled position here, so that the two absorption elements 22, 24 and the sliding block 26 are firmly connected with each other.

Upon a displacement of the sleeve element 12 in the axial direction, the two absorption elements 22, 24 and the sliding block 26 follow the movements of the sleeve element 12 without the two absorption elements being plastically deformed. This is possible because the coupling element 42 is connected, by means of the connecting part 54, to the adjusting element 44 so as to be movable in the axial direction, the adjusting element being vehicle-fixed in the coupled position. This allows the coupling element 42 to follow the movements of the absorption elements 22, 24 in the axial direction as long as the locking element 20 is in the open position.

Figure 9:
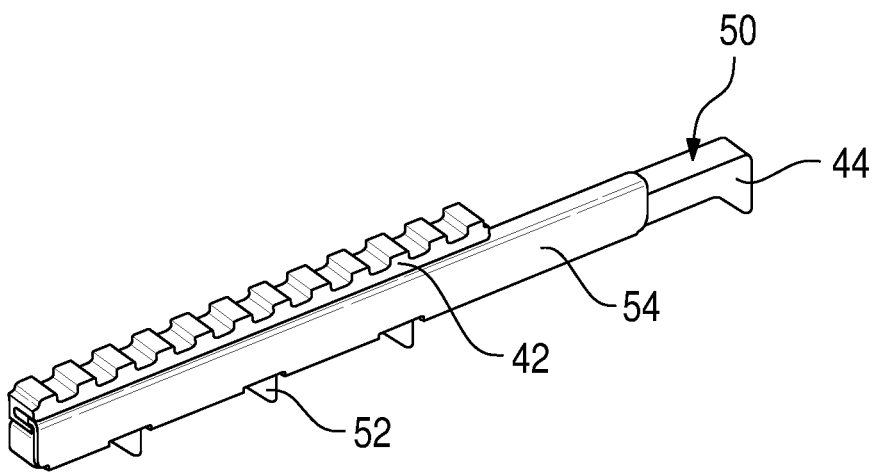
FIGS. 9(a) to (c) show a detail view of a coupling device of the steering column assembly according to the invention of FIG. 1.
Figure 9:
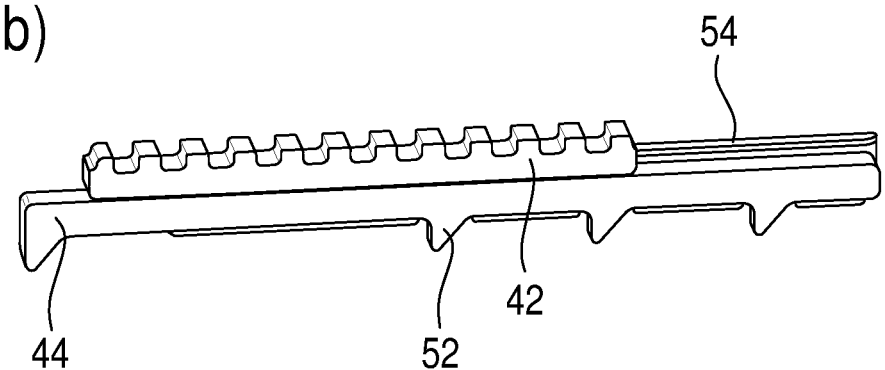
Figure 9:
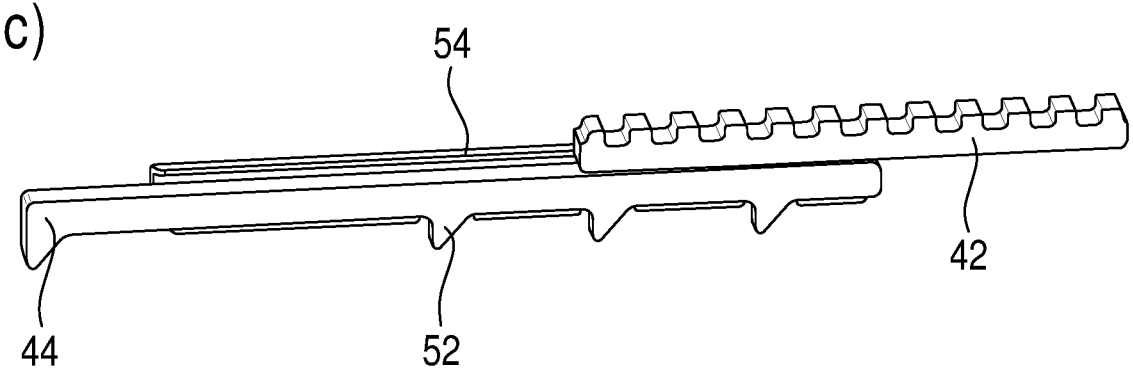

Various positions of the coupling element 42 relative to the adjusting element 44 that result from the adjustment of the steering wheel are shown in FIGS. 9(*a*) to (*c*). FIG. 9(*a*) shows the case in which the steering wheel is in a central position with respect to the axial direction. FIGS. 9(*b*) and (*c*) show the cases in which the steering wheel is adjusted away from the driver and towards the driver, respectively, in relation to the axial direction.

In accordance with the provisions of the patent statutes, the principle and mode of operation of this invention have been explained and illustrated in its preferred embodiments. However, it must be understood that this invention may be practiced otherwise than as specifically explained.

What is claimed is:

1. A steering column assembly for a motor vehicle, comprising:
    a vehicle-fixed mounting element and a sleeve element which is received within the mounting element and is mounted for displacement in an axial direction in the mounting element for adjustment of the steering column assembly;
    an energy absorption device which is adapted to be firmly coupled to the mounting element and is firmly connected with the sleeve element, the energy absorption device being deformed in consequence of a longitudinal displacement of the sleeve element in the event of a vehicle crash and absorbing part of a kinetic energy of the sleeve element during the event;
    a locking element having an open position and a closed position, the locking element, when in the open position, permitting an adjustment of the sleeve element and, when in the closed position, fixing the position of the sleeve element;
    a coupling device including a coupling element and having a coupled position and an uncoupled position;
    wherein the energy absorption device comprises at least a first absorption element and a second absorption element, each of which is configured to deform plastically by a relative movement of the sleeve element in relation to the mounting element in the case of the vehicle crash;
    wherein in the coupled position of the coupling device, the first absorption element is firmly coupled to the second absorption element by means of the coupling element;
    wherein in the closed position of the locking element, at least the first absorption element is firmly coupled to the mounting element, and in the open position, the coupling element is movable in the axial direction jointly with the sleeve element, and
    wherein, during a normal operation of the motor vehicle, the locking element is in the closed position and the coupling device is in the coupled position;
    wherein the coupling device comprises an adjusting element which has a first position and a second position, the adjusting element when in the first position holding the coupling element in the coupled position and when in the second position holding the coupling element in the uncoupled position; and
    wherein the adjusting element is a guide part which has an upper side which is configured as a longitudinal guide and is in contact with the coupling element, the guide part having wedge-shaped projections on a lower side facing away from an upper side.

2. The steering column assembly according to claim 1, wherein the mounting element has recesses provided therein which are shaped in such a way that the recesses are configured to receive the wedge-shaped projections of the guide part.

3. The steering column assembly according to claim 2, wherein the recesses are arranged obliquely in the axial direction of the sleeve element.

4. The steering column assembly according to claim 3, wherein the recesses are each arranged obliquely towards a steering wheel.

5. The steering column assembly according to claim 2, wherein, in the uncoupled position of the coupling device, the wedge-shaped projections of the guide part are received in the recesses.

6. A steering column assembly for a motor vehicle, comprising
- a vehicle-fixed mounting element and a sleeve element which is received within the mounting element and is mounted for displacement in an axial direction in the mounting element for adjustment of the steering column assembly;
- an energy absorption device which is adapted to be firmly coupled to the mounting element and is firmly connected with the sleeve element, the energy absorption device being deformed in consequence of a longitudinal displacement of the sleeve element in the event of a vehicle crash and absorbing part of a kinetic energy of the sleeve element during the event;
- a locking element having an open position and a closed position, the locking element, when in the open position, permitting an adjustment of the sleeve element and, when in the closed position, fixing the position of the sleeve element;
- a coupling device including a coupling element and having a coupled position and an uncoupled position;
- wherein the energy absorption device comprises at least a first absorption element and a second absorption element, each of which is configured to deform plastically by a relative movement of the sleeve element in relation to the mounting element in the case of the vehicle crash;
- wherein in the coupled position of the coupling device, the first absorption element is firmly coupled to the second absorption element by means of the coupling element;
- wherein in the closed position of the locking element, at least the first absorption element is firmly coupled to the mounting element, and in the open position, the coupling element is movable in the axial direction jointly with the sleeve element, and
- wherein, during a normal operation of the motor vehicle, the locking element is in the closed position and the coupling device is in the coupled position;
- wherein the coupling device comprises an adjusting element which has a first position and a second position, the adjusting element when in the first position holding the coupling element in the coupled position and when in the second position holding the coupling element in the uncoupled position; and
- wherein the adjusting element and the coupling element are connected by means of a connecting part in such a way that the coupling element is movable relative to the adjusting element in the axial direction of the sleeve element.

7. The steering column assembly according to claim 6, wherein the coupling element and the adjusting element are immovable relative to each other in directions perpendicular to the axial direction.

8. A steering column assembly for a motor vehicle, comprising
- a vehicle-fixed mounting element and a sleeve element which is received within the mounting element and is mounted for displacement in an axial direction in the mounting element for adjustment of the steering column assembly;
- an energy absorption device which is adapted to be firmly coupled to the mounting element and is firmly connected with the sleeve element, the energy absorption device being deformed in consequence of a longitudinal displacement of the sleeve element in the event of a vehicle crash and absorbing part of a kinetic energy of the sleeve element during the event;
- a locking element having an open position and a closed position, the locking element, when in the open position, permitting an adjustment of the sleeve element and, when in the closed position, fixing the position of the sleeve element;
- a coupling device including a coupling element and having a coupled position and an uncoupled position;
- wherein the energy absorption device comprises at least a first absorption element and a second absorption element, each of which is configured to deform plastically by a relative movement of the sleeve element in relation to the mounting element in the case of the vehicle crash;
- wherein in the coupled position of the coupling device, the first absorption element is firmly coupled to the second absorption element by means of the coupling element;
- wherein in the closed position of the locking element, at least the first absorption element is firmly coupled to the mounting element, and in the open position, the coupling element is movable in the axial direction jointly with the sleeve element, and
- wherein, during a normal operation of the motor vehicle, the locking element is in the closed position and the coupling device is in the coupled position;
- wherein the coupling device comprises an adjusting element which has a first position and a second position, the adjusting element when in the first position holding the coupling element in the coupled position and when in the second position holding the coupling element in the uncoupled position; and
- wherein the coupling device has at least one of a pyrotechnic and an electric actuator which is configured to switch the coupling device from the coupled position to the uncoupled position when or before a crash occurs and wherein the electric actuator includes a displaceable holding part, the mounting element including a recess adapted to receive the holding part.

9. The steering column assembly according to claim 8, wherein the holding part, when in an extended position, holds the adjusting element in the first position, and the actuator is configured to retract the holding part when or before a crash occurs.

10. A steering column assembly for a motor vehicle, comprising:
- a vehicle-fixed mounting element and a sleeve element which is received within the mounting element and is mounted for displacement in an axial direction in the mounting element for adjustment of the steering column assembly;
- an energy absorption device which is adapted to be firmly coupled to the mounting element and is firmly connected with the sleeve element, the energy absorption device being deformed in consequence of a longitudinal displacement of the sleeve element in the event of a vehicle crash and absorbing part of a kinetic energy of the sleeve element during the event;
- a locking element having an open position and a closed position, the locking element, when in the open position, permitting an adjustment of the sleeve element and, when in the closed position, fixing the position of the sleeve element;

a coupling device including a coupling element and having a coupled position and an uncoupled position;

wherein the energy absorption device comprises at least a first absorption element and a second absorption element, each of which is configured to deform plastically by a relative movement of the sleeve element in relation to the mounting element in the case of the vehicle crash;

wherein in the coupled position of the coupling device, the first absorption element is firmly coupled to the second absorption element by means of the coupling element;

wherein in the closed position of the locking element, at least the first absorption element is firmly coupled to the mounting element, and in the open position, the coupling element is movable in the axial direction jointly with the sleeve element, and wherein, during a normal operation of the motor vehicle, the locking element is in the closed position and the coupling device is in the coupled position; and wherein a spring element is provided which urges the coupling device towards the uncoupled position.

* * * * *